Feb. 6, 1962

J. ROSA 3,020,468

MAGNETIC AMPLIFIER

Filed March 2, 1959

WITNESSES

Edwin C. Baader

Myron E. Click

INVENTOR

John Rosa

BY F. E. Browder

ATTORNEY

United States Patent Office 3,020,468

Patented Feb. 6, 1962

3,020,468

MAGNETIC AMPLIFIER

John Rosa, Pittsburgh, Pa., assignor to Westinghouse Electric Corporation, East Pittsburgh, Pa., a corporation of Pennsylvania Filed Mar. 2, 1959, Ser. No. 796,572

4 Claims. (Cl. 323—89)

Figure 2:
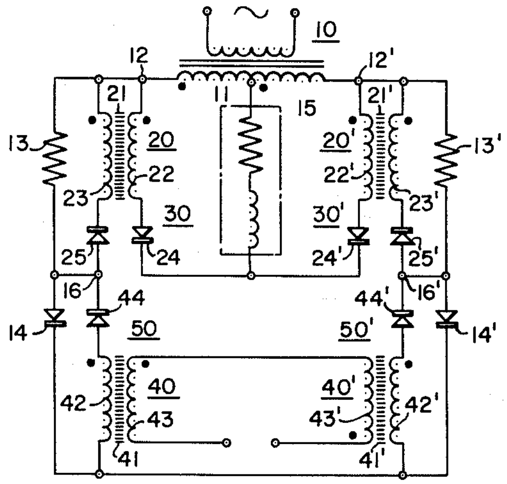

This invention relates to magnetic amplifiers in general and in particular to magnetic amplifiers for feeding inductive loads.

When magnetic amplifiers are feeding inductive loads, there is usually associated therewith an undesirable snap action. The theoretical background of this phenomenon is discussed in "Magnetic Amplifiers," by H. F. Storm, John Wiley & Sons, Inc., New York, 1955, pages 320–334. It is shown in Storm that snap action occurs when current flowing in the load or gating windings causes an induced voltage in the control or reset windings during the excitation period. This effect, which is undesirable if linear operation is required, can be partly eliminated by using freewheeling or commutating rectifiers, a high control circuit resistance or the addition of external inductance in the control circuit. In many applications, these methods cannot be used because of their unfavorable effect on the time constant and gain, respectively, of the magnetic amplifier.

It is, accordingly, an object of this invention to provide an improved magnetic amplifier which prevents the snap action discussed above without impairing performance.

It is another object of this invention to provide an improved magnetic amplifier which insures normal linear operation with highly inductive loads.

Further objects of this invention will become apparent when the following description is taken in conjunction with the accompanying drawing. In said drawing, for illustrative purposes only, there are shown preferred embodiments of this invention.

In the drawing the manner in which the windings are wound upon their associated saturable magnetic cores has been denoted by the polarity dot convention. That is, current flowing into the polarity dot end of a winding drives the associated core toward positive saturation. Current flowing out of the polarity dot end of a winding will drive the associated core away from positive saturation. The polarity dots also indicate like instantaneous points of polarity when dealing with induced voltages.

Figure 1:
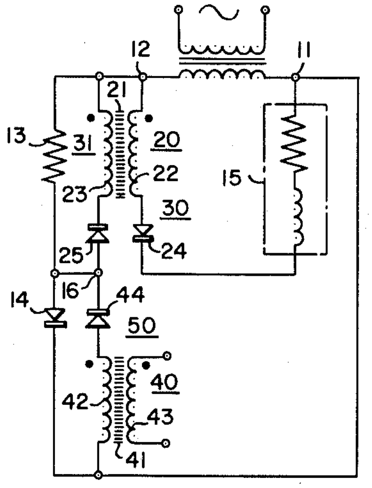

FIG. 1 is a schematic drawing of a basic half-wave magnetic amplifier embodying the teachings of this invention; and FIG. 2 is a schematic diagram of a center-tap, full-wave magnetic amplifier circuit embodying the teachings of this invention.

Referring to FIG. 1, the half wave magnetic amplifier schematically illustrated comprises a first stage magnetic amplifier 40 and a second stage magnetic amplifier 20. The first stage magnetic amplifier 40 controls the second stage magnetic amplifier 20, which, in turn, feeds an inductive load 15.

The magnetic amplifier 20 comprises a saturable magnetic core 21 having inductively disposed thereon a gating winding 22 and a reset winding 23. A gating circuit 30 for the magnetic amplifier 20 comprises the gating winding 22, a gating rectifier 24, and the load 15 all serially connected between a pair of terminals 12 and 11. A suitable alternating current voltage is to be applied to the terminals 12 and 11. A reset circuit 31 for the magnetic amplifier 20 comprises a reset rectifier 25 and the reset winding 23 both serially connected between a terminal 16 and the terminal 12.

The magnetic amplifier 40 comprises a saturable magnetic core 41 having inductively disposed thereon a gating winding 42 and a reset or control winding 43. A gating circuit 50 for the magnetic amplifier 40 comprises the gating winding 42 and a gating rectifier 44 both serially connected between the terminal 11 and the terminal 16. A coupling resistor 13 is connected between the terminal 12 and the terminal 16. A coupling rectifier 14 is connected between the terminal 16 and the terminal 11.

The triggering-free operation of the apparatus illustrated in FIG. 1 is obtained by the fact that, during the gating and conductive periods, a control or reset circuit of the magnetic amplifier is essentially an open circuit, while, during the reset period, the core is reset by a chopped sine wave. Consequently, there is no current flow through the control or reset winding during the gating and conducting periods and the core is reset by a voltage pulse which lasts for a shorter time than the non-conductive interval of the reset half cycle. This chopped sine wave, assuming a sinusoidal alternating current-voltage supply, used for resetting is furnished to the second stage magnetic amplifier 20 by the first stage magnetic amplifier 40.

The gating circuit 30 of the magnetic amplifier 40 is fed from the alternating current-voltage supply to be applied to the terminals 12 and 11. The reset circuit 31 and thus the reset winding 23 of the magnetic amplifier 20 is fed from the first stage magnetic amplifier 40. If the terminal 12 is positive and the terminal 11 is negative, current will flow from the terminal 12 through the winding 22, the rectifier 24, and the load 15 to the terminal 11. Thus, until the magnetic amplifier 20 "fires" or saturates, the gating winding 22 supports the whole line voltage applied to the terminals 12 and 11. Assuming that the gating winding 22 and the reset winding 23 have the same number of turns, then this same voltage that is supported by the gating winding 22 will be induced in the reset winding 23. However, during the same half cycle, current is flowing from the terminal 12 through the coupling resistor 13 and the coupling rectifier 14 to the terminal 11. The voltage drop in the resistor 13 opposes the voltage induced in the reset winding 23 and prevents current flowing in this winding as a result of the induced voltage. After the magnetic amplifier 20 "fires" the voltage induced in the reset winding 23 drops to a low value but the rectifier 25 still blocks the current.

On the second or next half cycle when terminal 11 is positive with respect to terminal 12, the gating rectifier 24 prevents current flow in the gating winding 22.

In the first stage gating circuit 50, on the second half cycle, the gating winding 42 has current flow therethrough from the terminal 11 through the gating rectifier 44 and the coupling resistor 13 to the terminal 12. Thus, the gating winding 42 is supporting the line voltage applied to the terminals 11 and 12 until the first stage magnetic amplifier 40 "fires." After the saturable magnetic core 41 has been driven to saturation and the magnetic amplifier 40 "fires," a current flows through the gating rectifier 44 and the resistor 13. This voltage which has a chopped sine waveform, again assuming a sinusoidal supply applied to the terminals 11 and 12, drops across the coupling resistor 13 with the terminal 16 positive and the terminal 12 negative. This voltage supplies a reset voltage for the second stage magnetic amplifier 20. That is, current will flow from the terminal 16 through the reset rectifier 25 and the reset winding 23 to the terminal 12 in such a direction as to reset the flux in the magnetic core member 21 of the magnetic amplifier 20.

The magnitude or the amount of the reset voltage dropped across the resistor 13 as furnished by the first stage magnetic amplifier 40 is determined by the value of the control current flowing in the reset winding 43 of the first stage magnetic amplifier 40. The control current in the winding 43 will flow out of the polarity dot, thus, driving the saturable magnetic core 41 away from positive saturation resetting the magnetic amplifier 40.

Therefore, it can be seen that the value of the control current flowing through the reset winding 43 of the first stage magnetic amplifier 40 will determine the "firing angle" of the first stage magnetic amplifier 40, and thus, the amount of reset voltage and the output of the gating circuit 30 of the first stage magnetic amplifier 20 can be determined.

Referring to FIG. 2 there is illustrated another embodiment of the teachings of this invention in which like components of FIGS. 1 and 2 have been given the same reference characters. The main distinction between the apparatus illustrated in FIGS. 1 and 2 is that in FIG. 2 a second two-stage half wave magnetic amplifier has been added to that of the apparatus of FIG. 1, and the entire circuit is supplied with an alternating current voltage source through the use of a center-tap transformer 10 to supply the load 15 with a full-wave output. The half wave circuit added in FIG. 2 is identical to that of FIG. 1 so the same reference characters have been utilized for like components with the exception that the reference characters of the added half wave circuit are denoted by primed numbers.

The operation of each of the half wave two-stage magnetic amplifiers illustrated in FIG. 2 is identical with the operation of the basic half wave two-stage magnetic amplifier illustrated in FIG. 1 with the exception that the half wave magnetic amplifier denoted by the primed reference characters is operating substantially 180° out-of-phase with the first half wave magnetic amplifier so that the load 15 may be furnished with a full-wave output from the circuit as illustrated. That is, when the terminal 12 is positive with respect to the terminal 11, the operation of the magnetic amplifier with the umprimed reference characters is identical to that illustrated in FIG. 1. When the terminal 12 is positive with respect to the terminal 11, the terminal 12 is also positive with respect to the terminal 12′. Thus, current will flow from the terminal 12 through the resistor 13 and the rectifier 14 and will be supplying the gating circuit 50′ of the first stage magnetic amplifier 40′ while the first stage magnetic amplifier 40 is being reset. On this same half cycle the same current that is gating the first stage magnetic amplifier 40′ will also reset the second stage magnetic amplifier 20′ as hereinbefore described. On the next or second half cycle the magnetic amplifiers 20′ and 40 will be gating and the magnetic amplifiers 20 and 40′ will be resetting.

Again, it can be seen that the triggering-free operation of the circuit illustrated in FIG. 2 is obtained by the fact that, during the gating and conducting periods, the reset circuits 30 and 30′ of the magnetic amplifiers 20 and 20′ are essentially open circuits, while, during the reset periods, the respective cores are reset by chopped sine waves which are dropped across the resistors 13 and 13′, respectively. Consequently, there is no current flow through the reset windings of the magnetic amplifiers 20 and 20′ during the gating and conducting periods and the respective cores are reset by voltage pulses which last for a shorter time than the non-conducting interval of the respective reset half cycles. The chopped sine waves are again furnished by the first stage magnetic amplifiers 40 and 40′, respectively.

In conclusion, it is pointed out that while the illustrated examples constitute practical embodiments of my invention, I do not limit myself to the exact details shown, since modification of the same may be varied without departing from the spirit and scope of this invention.

Claims of this invention:

1. In a system of control for supplying load current to a highly inductive load from the output of magnetic amplifier means, in combination, a pair of terminals energized with alternating current, a first stage magnetic amplifier, a second stage magnetic amplifier having a gating circuit, a saturable core, and a reset circuit, said gating circuit including a gating winding, a gating rectifier, and an inductive load connected to said terminals, said first stage magnetic amplifier having a gating circuit, a saturable core, and a reset circuit, said gating circuit of the first stage magnetic amplifier including a gating winding and a gating rectifier and the reset circuit of the second stage magnetic amplifier including a resetting rectifier and a resetting winding, said gating circuit of the first stage magnetic amplifier and reset circuit of the second stage magnetic amplifier being connected in series across said terminals, and two coupling impedances connected in series and respectively connected in parallel with the gating circuit of the first stage magnetic amplifier and the reset circuit of the second stage magnetic amplifier.

2. In a system of control for supplying load current to a highly inductive load from the output of magnetic amplifier means, in combination, a pair of terminals energized with alternating current, a first stage magnetic amplifier, a second stage magnetic amplifier having a gating circuit, a saturable core, and a reset circuit, said gating circuit including a gating winding, a gating rectifier, and an inductive load connected to said terminals, said first stage magnetic amplifier having a gating circuit, a saturable core, and a reset circuit, said gating circuit of the first stage magnetic amplifier including a gating winding and a gating rectifier and the reset circuit of the second stage magnetic amplifier including a resetting rectifier and a resetting winding, said gating circuit of the first stage magnetic amplifier and reset circuit of the second stage magnetic amplifier being connected in series across said terminals, a coupling resistor and a coupling rectifier connected in series to said terminals and being respectively connected in parallel with the resetting circuit of the second stage magnetic amplifier and the gating circuit of the first stage magnetic amplifier.

3. In a system of control for supplying load current to an inductive load from the output of magnetic amplifier means, in combination, a first terminal and a second terminal, said terminals being energized with alternating current, a second stage magnetic amplifier having a saturable core, a gating circuit and a reset circuit, a first stage magnetic amplifier having a saturable core, a gating circuit and a reset circuit, said gating circuit of the second stage magnetic amplifier including a gating winding, a gating rectifier, and an inductive load all three connected in series across said terminals with the rectifier poled to conduct from the second terminal toward the first, the gating circuit of the first stage magnetic amplifier including a gating winding and a series connected gating rectifier, and the reset circuit of the second stage magnetic amplifier including a reset rectifier and series connected reset winding, said last mentioned two circuits being connected in series across said terminals with the two rectifiers poled to conduct from the first terminal toward the second terminal, and two coupling impedances connected in series and respectively connected in parallel with the gating circuit of the first stage magnetic amplifier and the reset circuit of the second stage magnetic amplifier.

4. In a system of control for supplying load current to an inductive load from the output of magnetic amplifier means, in combination, a first terminal and a second terminal, said terminals being energized with alternating current, a second stage magnetic amplifier having a saturable core, a gating circuit and a reset circuit, a first stage magnetic amplifier having a saturable core, a gating circuit and a reset circuit, said gating circuit of the second stage magnetic amplifier including a gating winding, a gating rectifier, and an inductive load all three connected in series across said terminals with the rectifier poled to conduct from the second terminal toward the first, the gating circuit of the first stage magnetic amplifier including a gating winding and a series connected gating rectifier, and the reset circuit of the second stage magnetic amplifier including a reset rectifier and series connected reset winding, said last mentioned two circuits being connected in series across said terminals with the two rectifiers poled to conduct from the first terminal toward the second terminal, and a coupling resistor and a coupling rectifier connected in series across said terminals with the rectifier being poled to conduct from the second terminal toward the first, the coupling resistor being connected in parallel to the reset circuit of the second stage magnetic amplifier and the rectifier being connected in parallel with the gating circuit of the first stage magnetic amplifier.

References Cited in the file of this patent

UNITED STATES PATENTS

| | | |
|---|---|---|
| 2,734,165 | Lufcy et al. | Feb. 7, 1956 |
| 2,754,473 | Hooper | July 10, 1956 |